United States Patent [19]

Johnson et al.

[11] 4,444,479

[45] Apr. 24, 1984

[54] PHOTOGRAPHIC SYSTEM WITH SLOW BURN FLASH BULB

[75] Inventors: Bruce K. Johnson, Andover; George D. Whiteside, Lexington, both of Mass.

[73] Assignee: Polaroid Corporation, Cambridge, Mass.

[21] Appl. No.: 343,160

[22] Filed: Jan. 27, 1982

Related U.S. Application Data

[63] Continuation-in-part of Ser. No. 222,562, Jan. 5, 1981, abandoned.

[51] Int. Cl.³ .............................................. G03B 7/14
[52] U.S. Cl. ..................................... 354/413; 354/137
[58] Field of Search ................... 354/27, 33, 137, 138, 354/173

[56] References Cited

U.S. PATENT DOCUMENTS

| 2,321,945 | 6/1943 | Schwartz et al. | 354/138 |
| 2,517,407 | 8/1950 | Nilsen . | |
| 2,596,671 | 5/1952 | Fuerst . | |
| 3,200,723 | 8/1965 | Topaz . | |
| 4,040,072 | 8/1977 | Johnson et al. | 354/173 |
| 4,047,191 | 9/1977 | Coppa et al. | 354/27 |
| 4,104,653 | 8/1978 | Johnson et al. | 354/27 |
| 4,188,103 | 2/1980 | Biber et al. | 354/27 |
| 4,241,280 | 12/1980 | Abbadessa et al. | 354/33 |

OTHER PUBLICATIONS

"The Focal Encyclopedia of Photography", vol. 1, pp. 630-631.
"Photographic Lamp and Equipment Guide", General Electric Company, pp. 4-5.

Primary Examiner—Russell E. Adams
Attorney, Agent, or Firm—David R. Thornton

[57] ABSTRACT

A photographic system for minimizing exposure tracking error under flash illumination using a low-cost camera in which an automatic shutter system constitutes the sole control of exposure illumination passed to the film. The source of flash illumination is a low-cost filament vaporizable flash bulb in which the effective burn time is increased without change in total illumination energy to the maximum interval of exposure time compatible with hand-held camera operation. The reduced maximum intensity and lengthened burn time reduces the proportionate amount of exposure illumination during shutter closing movement and, consequently, the deleterious effect of variation in shutter closing movement so that exposure with varying camera/subject distances and flash illumination is relatively unaffected.

6 Claims, 5 Drawing Figures

PHOTOGRAPHIC SYSTEM WITH SLOW BURN FLASH BULB

CROSS-REFERENCE TO RELATED APPLICATION

This application is a continuation-in-part of application Ser. No. 222,562, filed Jan. 5, 1981, now abandoned.

BACKGROUND OF THE INVENTION

This invention relates to photographic apparatus and, more particularly, it concerns a photographic system by which photographic film may be properly and uniformly exposed over a range of camera/subject distances using a vaporizable filament flash bulb.

Completely automatic, low-cost photographic cameras in which the photographer need only aim the camera at a subject to be photographed and press a button to achieve proper exposure of camera-contained film, assuming the design limits of the camera and film are not exceeded, are available in the present photographic market from several manufacturing sources. Because the operating range and correspondingly the refinements available in a photographic camera are based largely on the size of the camera lens aperture, low-cost cameras commonly employ relatively small maximum lens apertures on the order of f/11 or smaller so as to ensure a relatively large depth of field, particularly when a fixed focus lens is employed. Film exposure is effected by an electronically controlled shutter system in which shutter speed and aperture size variation are governed by a photoresponsive cell and appropriate circuitry built into the camera. Electronically controlled shutter systems of this type are well-known and sufficiently developed so that the cost of such a system is fully consistent with incorporation in low-cost cameras of the type under discussion.

The relatively small maximum lens aperture of low-cost cameras requires more extensive use of artificial illumination. Again because of cost constraints, at least in terms of the initial investment required to purchase the camera, low-cost cameras are traditionally equipped to receive disposable, vaporizable filament flash bulbs or multi-bulb flash arrays in which illumination energy is fixed. In such cameras, exposure control with flash illumination is often predicated solely on the electronic shutter system together with other fixed design parameters of the camera and of the flash illumination source. In this respect, two basic difficulties regarding control of film exposure are presented; namely, the uniformity of the time interval required for the shutter to close after a photometrically generated close command signal is generated, and the inherent variation in intensity of flash illumination during the flash operation. The result of improper film exposure by flash illumination is referred to as "tracking error" and is manifested by overexposure where the camera/subject distance is less than a design norm or by underexposure where the subject is farther from the camera than the average distance for which the camera and flashlamp are designed.

Heretofore, the problems associated with tracking error using shutter control of flash illumination has been substantially avoided by compensating the circuitry of the electronic shutter control system. The circuitry typically includes a light integrating circuit to control the time interval between opening of the shutter and the command signal for closing of the shutter as a function of the time integral of light intensity received by a photocell, or equivalent, subsequent to the shutter opening. As disclosed in U.S. Pat. No. 3,200,723 issued Aug. 17, 1965 to J. M. Topaz, for example, the circuitry may be modified to shorten the timing interval of the circuit by adding a fixed resistance when flash illumination is used. Basically, the series addition of a fixed resistance to the capacitor and the variably resistive photocell in a battery powered RC timing circuit reduces the time required to reach a trigger voltage (i.e., the shutter closing command signal). The added fixed resistance has the effect of increasing the initial voltage (IR) which increases to the trigger voltage at a rate determined by the photocell resistance which, in turn, varies inversely with the intensity of light thereon. Since the rate of voltage increase is nearly constant, the added fixed resistance used only during a flash exposure mode shortens the effective timing interval of the RC circuit so that initiation of shutter closing is advanced to compensate for the characteristics of flash illumination.

It is to be noted that the aforementioned compensating circuits vary the time only of the closing command signal and that the actual time required for complete shutter closure after this signal remained unchanged. This solution is acceptable where the closing time is sufficiently predictable. However, the latter requires relatively costly shutter design and manufacturing control to minimize the variation in shutter closing time from camera to camera.

With the development of faster film speeds, the problems of tracking error in a flash operational mode are sufficiently more acute that acceptable limits on the tracking error cannot be economically achieved by compensation of the shutter control circuit alone. With more sensitive films, variations in the amount of exposure intensity during shutter closing will have a more noticeable effect on film exposure. Higher film speeds also require less light and if overall cost criteria are to be met, the amount of flash illumination energy supplied in an individual flash bulb should be reduced. Where the total energy of the flash illumination is reduced to accommodate the higher speed films, however, the intensity/time curve of incandescent or vaporizable lamps approaches an isosceles triangle in which light intensity increases at a relatively constant rate during the first half of the time duration of illumination and then decreases at essentially a similar rate during the second half of the time interval. Increased tracking error then occurs as a result of widely varying areas (illumination energy) under the intensity/time curve for different increments of the same time lag (shutter closing time) over the total duration of flash illumination. In other words, the effect of the shutter closing can result in unacceptable overexposure at short camera/subject distances and underexposure at longer than normal camera/subject distances. To reduce this tracking error by increasing the fixed resistance of the anticipation circuit leads to an unacceptably large resistance and also still falls short of providing a complete solution.

SUMMARY OF THE INVENTION

In accordance with the present invention, a photographic system is provided by which tracking error in exposure by flash illumination is substantially avoided by utilizing a flash system of a fixed illuminating capacity having a selected burn time, defined by the time interval during which illumination intensity is maintained at least at one-half the maximum intensity for a short time, approximately equal to the longest interval of exposure compatible with hand-held camera operation. The combination of limited intensity and length of burn time in the flash bulb provides a highly economic system having a relatively small quantity of illumination passing to the film during intervals of shutter closing movement, irrespective of shutter speeds needed for proper exposure. This result, in turn, leads to proper film exposure with flash illumination throughout the design range of camera/subject distances.

A principal object of the present invention is, therefore, the provision of an improved flash photographic system which will provide proper exposure with flash illumination over varying distances in a low-cost camera. Another object is to provide a flash camera system having an optimized flash burn time. Other objects and further applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
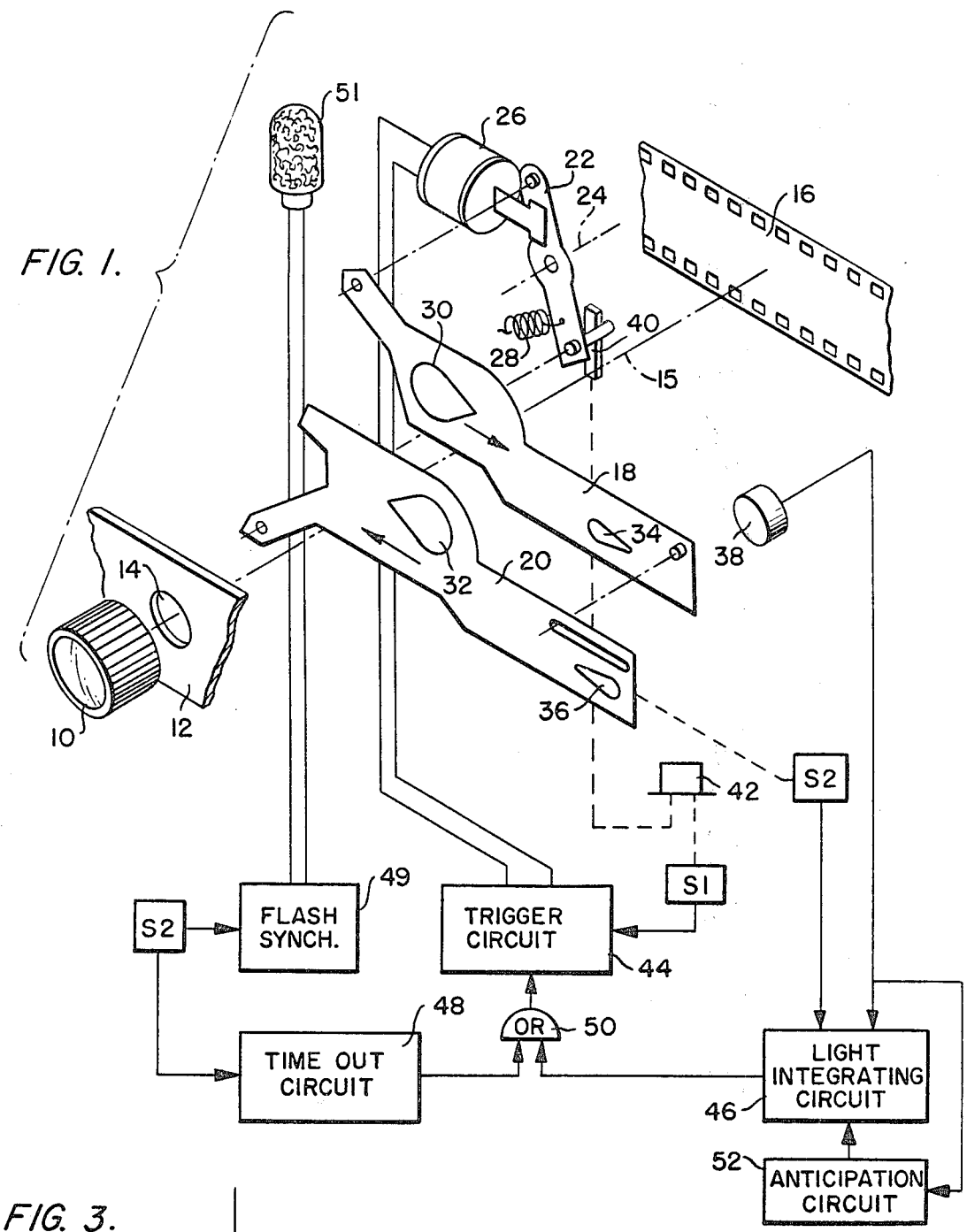
FIG. 1 is a schematic diagram illustrating a camera constructed in accordance with the present invention.

FIG. 1 of the drawings illustrates basic functioning components of a low-cost camera schematically and in block diagram form to simplify that portion of the ensuing description which relates to subject matter known in the photographic art. Thus in FIG. 1, a camera system is shown to include an objective lens 10 (for example, a fixed focus lens) adapted to be supported from a lens board 12 defining a fixed maximum lens aperture 14. The size of the aperture 14 will determine the depth of focus or range of camera/subject distances within which the light image of a subject to be photographed will be focused by the lens 10 at a film plane represented in FIG. 1 by a light sensitive film strip 16. In accordance with conventional practice, the film strip is supported within the dark chamber of a camera body (not shown).

While the size of the aperture 14 may be varied to accommodate different film speeds as well as variations in the shortest camera/subject distance contemplated by the design of the system, it is preferred that the diameter of the fixed aperture 14 be no larger than f/19 for a film speed of ASA 600 in a camera intended for use with a minimum camera/subject focus distance of four feet. The size of the aperture 14 or its equivalent in determining the maximum effective aperture may be reduced to f/27 to achieve focusing down to two feet with the same film speed.

The amount of image light passing from the lens 10 to the plane of the film strip 16 on an exposure or taking axis 15 is controlled by an automatic shutter mechanism illustrated as including a pair of reciprocable shutter blades 18 and 20 pivotally connected to opposite ends of a walking beam 22 which, in turn, is pivotal about a central axis 24. The walking beam is connected on one side of the pivotal axis 24 to a solenoid 26. A tension spring 28 is connected to the walking beam 22 on the opposite side of the pivot axis 24. The shutter blades 18 and 20 are respectively provided with tear shaped exposure apertures 30 and 32 which are moved by reciprocable motion of the blades 18 and 20 from a relative position of complete nonalignment in a closed shutter condition to varying degrees of alignment over the taking axis 15 in an open shutter condition. From the organization of the shutter blades 18 and 20, the walking beam 22, the solenoid 26 and the spring 28, it will be appreciated that when energized, the solenoid 26 will pull the blades 18 and 20 to a closed shutter condition. When released, the tension spring will pivot the walking beam 22 to reciprocate the blades 18 and 29 to an open shutter condition.

During opening movement of the shutter blades 18 and 20, light is also passed in a conventional manner through a camera housing opening (not shown) and a pair of auxiliary apertures 34 and 36 carried by the shutter blades to a light responsive transducer or photocell 38. The cell 38 is incorporated in electronic circuitry contained within the camera as disclosed, for example, in the aforementioned U.S. Pat. No. 3,200,723.

Although reference may be made to the aforementioned U.S. patent as well as other commonly assigned patents and copending applications to be identified below for a full understanding of details, the illustration in FIG. 1 will suffice for an appreciation of operating principles relevant to the present invention. Thus in the organization of components illustrated in FIG. 1, the shutter blades 18 and 20 are initially retained in their closed position against the bias of the tension spring 28 by a latch 40 connected with an actuating button 42 in turn connected to close a normally open switch S1 upon depression to initiate an exposure cycle. Upon movement of the latch 40 by such depression of the button 42, the blades will move toward an open position under the biasing force of the tension spring 28. Upon the occurrence of such movement, a normally closed switch S2 will be opened by movement of the blade 20, for example. Closure of the switch S1 will enable a trigger circuit 44, whereas opening of the switch S2 will initiate operation of a light integrating circuit 46 such that when the amount of light passed to the cell 38 corresponds to the amount of light needed for proper exposure of the film strip 16, a shutter closing signal at the trigger circuit 44 will energize the solenoid 26 to inititate closing movement of the shutter blades 18 and 20 and return the blades to a closed shutter condition to terminate exposure. For a more complete description of an exemplary shutter control system, reference should be had to U.S. Pat. Nos. 4,040,072 and 4,104,653 issued on Aug. 2, 1977 and May 3, 1977, respectively, to B. K. Johnson and G. D. Whiteside.

The aforementioned exposure cycle is representative for an ambient light mode of operation or where the subject matter to be photographed is illuminated by daylight or a comparable constant source of illumination. The amount of light to which the film 16 is exposed is primarily dependent on the length of time the shutter blades remain in an open condition and the shape of the apertures 30 and 32 which determine the size of opening defined over the taking axis 15. In this latter respect, it will be appreciated that if the solenoid 26 is energized prior to full opening movement of the blades 18 and 20 (due to high ambient illumination, for example) the opening defined by the oppositely oriented tear shaped apertures will be smaller than where the blades 18 and 20 are moved completely to a fullopen position where the base or bulbous portions of the apertures 30 and 32 come into registration with each other. In any event, movement of the shutter blades 18 and 20 from a closed condition to an open condition and back to a closed condition is governed by scene light passing through the secondary apertures 34 and 36 to the cell 38, and the response of the system to such light which, given the current state of the art, may be considered instantaneous. Although movement of the shutter blades and other mechanical components of the shutter system is relatively noninstantaneous, the system may be calibrated to account for the actual time interval incurred in such movement without difficulty at least under ambient lighting conditions.

As subsequently explained with regards to flash operation, the light integration operation is modified in a conventional manner for either ambient or flash exposures with the mode of operation being automatically selected in response to insertion and removal of the flash 51. Furthermore, while the ambient mode arrangement utilizes the described scanning shutter it is otherwise of little import herein since, as later explained with regard to the flash mode, the flash operates at full aperture.

Because the length of time that the shutter mechanism remains in an open condition is predicated solely on the amount of light seen by the cell 38, it is preferred that the time of the open shutter condition be restricted to a maximum length of time. Although the specific time of exposure may vary substantially with varying focal lengths of the lens 10, for example, and the use for which the camera is intended, a minimum shutter speed of 1/50 second or 20 milliseconds is assumed reasonable for a hand-held camera. Slower shutter speeds are presumed likely to cause a loss of resolution or blurring in the resulting photograph. On the other hand, shutter speed sufficiently slow to cause such blurring can result in the avoidance of underexposure in conditions where subnormal ambient lighting is incurred or with excessive camera/subject distances in a flash mode of film exposure. Automatic shutter systems used with amateur cameras typically employ an override limiting the maximum time of an open shutter condition to an interval on the order of 1/20th of a second or 50 milliseconds. Thus, in the present arrangement the maximum time the shutter is permitted to remain in an open condition under the control of the light integrating circuit 46 is limited to 50 milliseconds by a time-out circuit 48 (shown in FIG. 1) which is connected with the trigger circuit 44 of the light integrated circuit 46 through an OR gate 50. Details of an automatic shutter system including such an arrangement are shown in a commonly assigned copending application Ser. No. 189,722 filed Sept. 22, 1980, by B. K. Johnson, et al, now U.S. Pat. No. 4,346,921 issued Aug. 31, 1982. It will suffice for the present description, however, to note that the time-out circuit will override the light integrating circuit to provide a minimum shutter speed or a maximum time during which the shutter blades 18 and 20 are permitted to remain in an open condition.

To facilitate a flash illumination mode of operation, a flash synchronization circuit 49 is provided to be actuated by opening movement of the switch S2. The synchronizing circuit 49 in conjunction with switch S2 are conventional mechanisms arranged in the embodiment of this invention to fire the flash 51 when the blades reach a full open condition. Thus, except when a flash exposure is attempted under high ambient conditions (which precludes the system from reaching full open) all flash exposures are made at the full open or maximum aperture. Consequently, while the varying apertures produced by the scanning shutter are available for ambient exposures, the camera is essentially a fixed aperture camera for flash and the burden of flash control with subject distance or flash tracking then solely rests on the shutter closing. Thus, film exposure by flash illumination in the system of the present invention is governed by the fixed maximum aperture 14, or its equivalent by registration of the shutter blade apertures 30 and 32 in a fullopen condition. Hence, the flash contribution to the exposure is determined by the quantity of flash illumination reflected from the subject through the aperture 14 to the film 16 during the time interval between firing the flash bulb 51 and complete closure of the shutter blades. It should be noted that while a single flash bulb 51 is shown, it is preferable that the latter be provided in an array for firing in order with each successive exposure.

The quantity of light emitted by the flash bulb 51, or the total light energy thereof, is a predictable value and determined by the design of the bulb. Flash illumination reflected from a subject to be photographed, however, will vary in intensity primarily with the distance between the flash lamp and the subject or with camera/subject distance. Another incident of flash illumination which is relevant is that the amount of light available for exposure of the film strip 16 is predicated on the rapidly varying intensity of the flash illumination over a relatively short period of time. As a result, the response capabilities of the shutter system become more critical with flash illumination generally than with ambient light. In particular, the amount of flash light transmitted by the shutter apertures 30 and 32 after the generation of a shutter closing signal by the trigger circuit 44 (during movement of the blades 18 and 20 to a fully closed condition) must be accounted for to achieve proper exposure of the film strip 16 with flash illumination. To this end and as disclosed in the aforementioned U.S. Pat. No. 3,200,723, an anticipation circuit 54 is activated to advance the instant of the shutter closing signal in the exposure time interval. In this connection, reference is also made to a commonly assigned U.S. Pat. No. 4,241,280 which describes an anticipation circuit employed for quench control of flash illumination.

Figure 2:
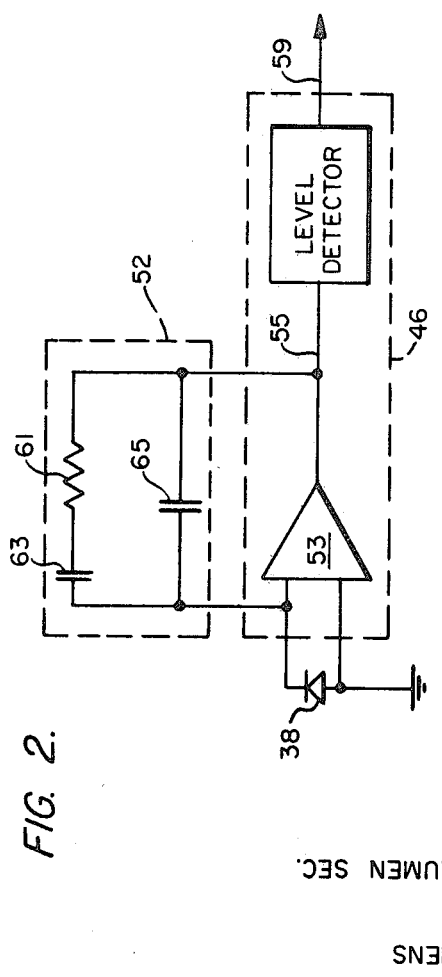
FIG. 2 is a diagram showing anticipation circuitry in the shutter system of FIG. 1.

An embodiment of the anticipation circuitry disclosed in U.S. Pat. No. 4,241,280, adapted to the present system represented in FIG. 1, is shown in FIG. 2 of the drawings. In FIG. 2, circuitry corresponding to the light integrating circuit 46 is enclosed with a dashed-line rectangle designated by the numeral 46 whereas circuit components corresponding to the anticipation circuit 52 are enclosed by a dashed line rectangle designated by the numeral 52.

In FIG. 2, the photoresponsive element or cell 38 is connected across the input terminals of a differential type operational amplifier 53. The anticipation circuit 52 is in the nature of a feedback circuit between one of the inputs of the amplifier 53 and the output 55 of the amplifier. The result of this arrangement, as described in the aforementioned U.S. Pat. No. 4,241,280, is that the cell 38 operates in a constant current mode of operation under conditions of non-varying scene light intensity to provide a substantially linear output response at the amplifier output 55. The output terminal 55 of the amplifier is connected to a level detector 57, the output 59 of which is in turn connected to the trigger circuit 44 through the OR gate 50 as described above.

Figure 3:
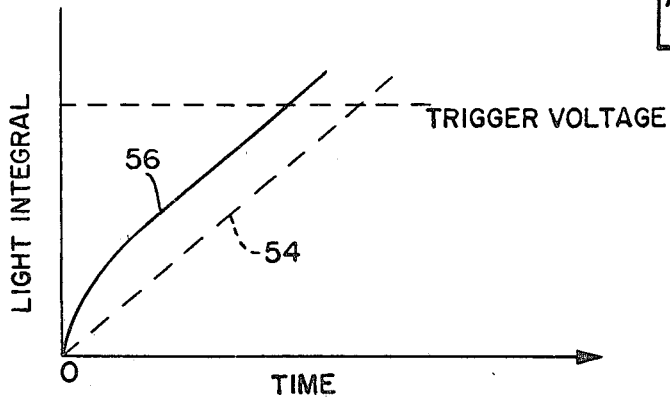
FIG. 3 is a graph illustrating the results of anticipation circuitry shown in FIG. 2.

The anticipation factor of the circuit 52 is provided by serially connecting a resistive element 61 with a capacitive element 63. The output integration signal response at the output terminal 55 for this arrangement is represented in FIG. 3 of the drawings. In FIG. 3, the dashed line 54 represents the rate of light integrating circuit output or voltage against time for a given ambient lighting condition. When the light integral reaches a trigger voltage, the shutter closing signal is developed and the solenoid 26 is energized. The solid line in FIG. 3 represents operation with the anticipation circuit 52. Specifically, the time interval required for the light integral to reach trigger voltage is advanced to compensate for the flash illumination passing the apertures 30 and 32 during movement of the blades 18 and 20 to a closed shutter condition.

The RC time constant for the capacitor 63 and the resistor 61 determines the break point for the curve 56 or the instant at which the slope of the curve 56 equals the slope of the curve 54. Varying the value of the resistor 61 causes a corresponding variation in the anticipation time, represented in FIG. 3 by the length of a horizontal line between the curves 56 and 54. In particular, an increase in the value of the resistor 61 will increase the anticipation time. Also, a change in the value of the resistor 61 will effect a corresponding change in the RC time constant which effects the break point of the curve 56.

A capacitor 65 connected in parallel relation with respect to the serially connected resistor 61 and capacitor 63 functions to filter or dampen the output response of the circuit 52 during the initial charge-up time of the capacitor 63 in order to prevent transient oscillations which can occur under certain conditions. Thus, the capacitor 65 provides a smooth transition from the initiation of scene light detection and integration to the break point where output integration signal approaches the desired slope. The slope of the linear portion of the scene light integration curve 56 is determined by the combined values of the capacitors 64 and 65 which, because of the parallel connection of these capacitors, equals the summation of the values of the capacitors 63 and 65 in FIG. 2. While the operation of the circuitry illustrated in FIG. 2 is believed clear, the disclosure of U.S. Pat. No. 4,241,280 is expressly incorporated by reference herein to the extent that it is needed for further details with respect to the circuit.

It is to be noted that tracking error or variation in film exposure due to different camera/subject distances (i.e., overexposure with close-ups and underexposure with distant subjects) in a camera system of the type represented in FIG. 1 is the result of an inability of the shutter system to adequately control the reflected flash illumination passing to the film strip. With relatively slow speed or less sensitive films where the amount of illumination needed for proper exposure is relatively large, tracking error can be reduced to an acceptable degree as a result of the anticipation circuit 52 alone. This capability is believed due in part to the time of shutter closing movement being small in relation to the total amount of light needed for proper exposure of the film.

With high speed films, however, and a flash bulb designed to provide the proper amount of light for a design, or medial camera/subject distance, any variation in the time duration of shutter closing movement is a more substantial portion of the total film exposure time. Such variation is, moreover, a time increment with finite minimal limits given the current state of the art relative to shutter mechanisms.

Figure 4:
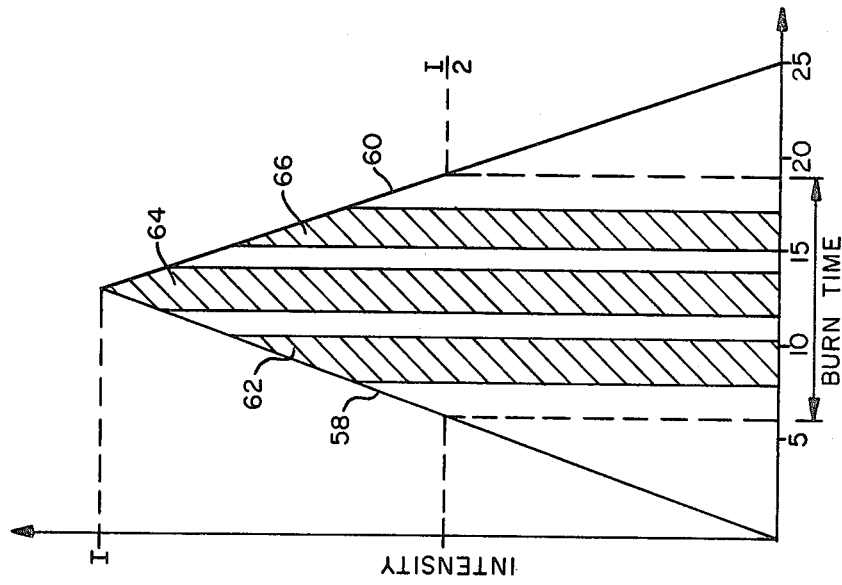
FIG. 4 is a graph illustration representative of exposure illumination during shutter closing movement with a conventional source of flash illumination.

In FIG. 4 of the drawings, the illumination characteristics of a flash bulb designed using conventional criteria for the exposure of high speed film in a camera system represented by FIG. 1, is illustrated in graphic form. In particular, the burn characteristics of such flash bulb exhibit a rapid increase in light intensity as depicted by the line 58 followed by a substantially rapid rate of intensity decay along the line 60. Thus, the total amount of illuminating energy is represented by the area of an essentially isosceles triangle defined by the abscissa and the lines 58 and 60. While the prior art flash envelope is shown for convenience as essentially an isosceles triangle, it should be understood that the rise and fall of such flash units are not straight lines or equal; however, such deviation is of no import herein.

Burn time is conventionally defined as the interval of time during which light intensity is above an intensity value $I/2$ which is one-half the maximum intensity $I$ achieved by the bulb. This definition of burn time is selected also because it represents a parameter which is the equivalent of shutter speed under ambient light exposure conditions. In other words, the burn time exemplified in FIG. 3 by using conventional design criterion for a given high speed film is on the order of 10 milliseconds or the equivalent shutter speed of 1/100th of a second.

In FIG. 4, the shaded areas 62, 64 and 66 represent the quantity of light passed to the film strip 16 during movement of the shutter blades 18 and 20 to a closed condition at varying camera/subject distances. Assuming a given ambient light level, at a close subject distance, the reflected flash illumination will be high such that the close command will produce an early shutter closing during which the exposure illumination represented by the area 62 will occur. For a medial camera/subject distance, the close command will occur at a later time, and flash illumination reaching the film during this closing is represented by the area 64. Finally, the area 66 is representative of a more distant camera/subject distance. Because of the rapid rate of intensity build up and decay, it will be seen that the areas 62, 64 and 66 represent substantial differences of exposure illumination. These differences, coupled with their proportion of the total exposure illumination, make it difficult to sufficiently reduce tracking error.

Figure 5:
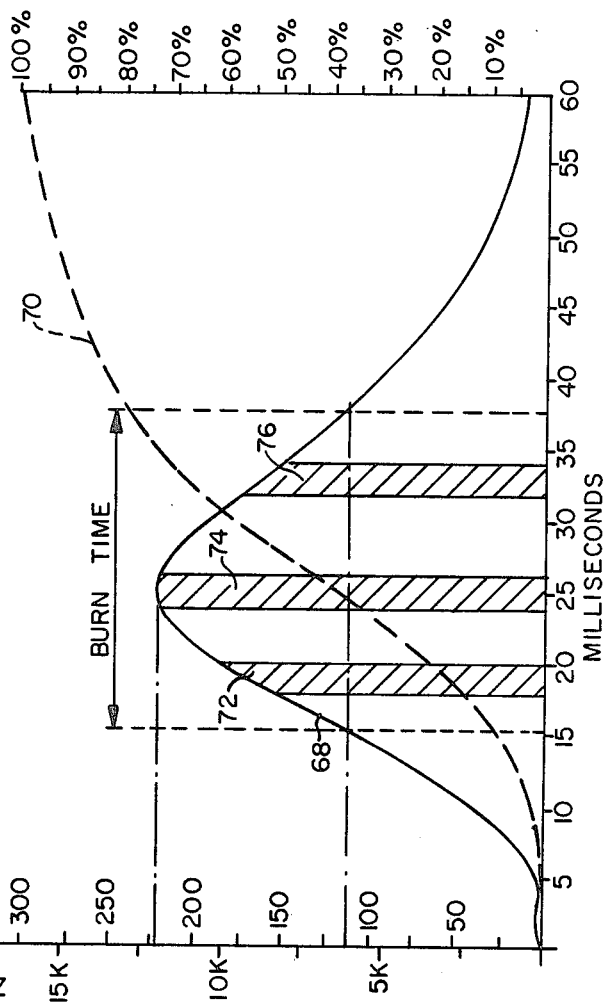
FIG. 5 is a graph similar to FIG. 4, but illustrating exposure illumination in accordance with the present invention.

In FIG. 5, the characteristic light intensity/time curve is shown for a vaporizable flash filament flash bulb having the same total illumination capacity as that represented in FIG. 4, but with the flash bulb, represented by FIG. 5, modified in accordance with the present invention at no increase in manufacturing costs to lengthen the burn time to approximately 20 milliseconds (1/50 of a second), or that is, to the longest interval of exposure reasonably compatible with hand-held operation. Increasing the burn time to this interval results in a reduction of the maximum intensity $I_s$ while retaining the same overall illumination inasmuch as the area under the curve 68 in FIG. 5 remains the same as the area under the lines 58 and 60 in FIG. 4 since the flash bulbs represented have the same total illumination capacity or energy. In FIG. 5, the areas 72, 74 and 76 again represent the quantity of light passed to the film during closing under relatively close, medial and remote camera/subject distances in the same manner as the areas 62, 64 and 66 in FIG. 4.

The curves shown in FIG. 5 are reasonably accurate reproductions of the illumination curves exhibited by actual practice of the invention. In particular, the solid line curve 68 in FIG. 5 is a plot of illumination intensity expressed on the ordinate axis as units of zonal lumens and on the abscissa axis in milliseconds. The dashed line curve 70 in FIG. 5 is a result of plotting units of zonal lumen seconds or power against time. The term "zonal lumens" is the light intensity in a cone of dispersion diverging at an angle of approximately 40° and thus the intensity of light projected to subject matter "seen" by the film 16 during exposure. From FIG. 5 it will be appreciated, therefore, that the maximum intensity of flash illumination is approximately 12,500 zonal lumens and this point in the curve is reached at approximately 25 milliseconds after the flash is fired. The maximum power of the bulb in zonal lumen seconds is reached at the expiration of flash illumination and is approximately 325 zonal lumen seconds. It will be noted further in FIG. 5 that the burn time extends from approximately 15 milliseconds to slightly in excess of 35 milliseconds. The actual burn time of the flash lamp represented by the solid line curve 68 in FIG. 5, therefore, is slightly in excess of 20 milliseconds. It has been found that burn times of up to approximately 24 milliseconds can be used without appreciable blurring or loss of resolution due to camera movement.

Because of the longer burn time and reduced maximum intensity, however, two important advantages are obtained by the flash bulb of FIG. 5 as compared with the flash bulb represented by FIG. 4; namely, (1) for a given ambient light level, the length of time the shutter mechanism remains in an open condition in the flash mode is increased so that light passing the shutter during movement of the blades 18 and 20 to a closed condition is substantially reduced in proportion to the total light needed for proper exposure of the film strip 16, and (2) the effect of variation in shutter closing speed is reduced since the variation in the amount of light passing the shutter during such closing movement, represented by the areas 72, 74 and 76 in FIG. 5, will be reduced.

Use of the flash bulb modification represented by FIG. 5 has demonstrated surprising results in practice. With a conventional flash bulb (represented by FIG. 4) supplied under specification to have a total illuminating energy (approximately 325 zonal lumen seconds) adequate to expose a high speed film (ASA 600) in a low-cost camera of the type represented by FIG. 1 and having a fixed flash aperture (the maximum camera aperture) of f/19, photographs taken at a camera/subject distance of eight feet were underexposed by approximately ¾ of a stop and overexposed at three feet by about ½ stop for a total tracking error of 1¼ stops. By increasing the effect of the anticipation circuit 52 (specifically by increasing the resistance 61 of this circuit in relation to the capacitors 63 and 65 thereof) tracking error in photographs taken at the same camera/subject distance was reduced to about 3/5 of a stop. Further attempts at increasing the effect of the anticipation circuit resulted in little if any decrease of the tracking error. Photographs taken at the same fixed aperture and same camera/subject distances using the maximized anticipation circuit and the vaporizable filament flash bulb represented by FIG. 5 (one having a burn time of 20 milliseconds) resulted in a reduction of tracking error to zero. In other words, there was no discernible difference in exposure of photographs taken at three feet and at eight feet using the flash bulb of FIG. 5 having a 20 millisecond burn time.

In light of the foregoing, the present invention results in a substantially improved photographic system by which a tracking error resulting from flash illumination in simple low cost cameras may be substantially eliminated. It is contemplated and also believed to be apparent to those skilled in the art from the preceding description that modifications and/or changes may be made in the disclosed embodiment without departure from the present invention. Accordingly, it is expressly intended that the foregoing description and accompanying drawings are illustrative of a preferred embodiment only, not limiting, and that the true spirit and scope of the present invention will be determined by reference to the appended claims.

What is claimed is:

1. A photographic system for exposure of film having a fast film speed, said system comprising:
   a camera having an objective lens adequate to yield a range of camera/subject distances extending from a minimum focus distance and within such range the image of a subject is focused at a film plane defined by the camera;
   a shutter operable between an open condition defining a fixed exposure aperture to pass light from said lens to said film plane and a closed condition to block such passage of light, said shutter constituting the sole means for determining light to which the film is exposed;
   means responsive to initiation of a camera cycle for actuating said shutter to its said open condition;
   means for generating a shutter closing signal in response to scene light including an anticipation circuit to advance the time of said shutter closing signal in accordance with increased scene illumination;
   means responsive to said shutter closing signal for moving said shutter from said open condition to said closed condition during a definite interval of shutter closing time;
   a vaporizable filament flashbulb mounted on said camera,
   said flash bulb producing illumination of a fixed amount limited to provide proper exposure of light sensitive film at said film plane for a predetermined maximum camera/subject flash distance and having an intensity of illumination variable with time between minimum and maximum values, said flash bulb having an extended burn time, measured between the rise and fall of the intensity to approximately one-half said maximum value, substantially equal to the longest interval of time compatible with hand-held camera operation; and
   means for energizing said flash bulb in fixed relation to opening said shutter to said fixed aperture and so that said interval of shutter closing time occurs exclusively during said extended burn time for camera/subject distances between said minimum focus distance and said predetermined maximum camera/subject flash distance, to thereby maximize the exposure time for said given aperture for each subject distance and reduce the proportionate amount of flash illumination passed to the film plane during the closing interval while maintaining flash bulb efficiency.

2. The system of claim 1 in which said burn time of said source of flash illumination is approximately 20 milliseconds.

3. A photographic system for exposure of film having a fast film speed, said system comprising:

a camera having an objective lens adequate to yield a range of camera/subject distances extending from a minimum focus distance and within such range the image of a subject is focused at a film plane defined by the camera;

means for defining a given aperture including a shutter operable between a full-open condition at said given aperture to pass light from said lens to said film plane and a closed condition to block such passage of light;

means responsive to initiation of an exposure cycle for actuating said shutter to its open condition;

a vaporizable filament flash bulb mounted on said camera, said flash bulb having a fixed energy of illumination limited to provide proper exposure of the film at said given aperture for a predetermined maximum camera/subject flash distance and having an intensity of illumination variable with time between minimum and maximum values, said flash bulb having an extended burn time, measured between the rise and fall of the intensity to approximately one-half said maximum value, substantially equal to the longest interval of time compatible with handheld camera operation;

means for generating a shutter closing signal in response to scene light, including light reflected to the camera from the subject to be photographed, said signal generating means including an anticipation circuit to advance the time of said shutter closing signal in accordance with increased scene illumination;

means responsive to said signal for moving said shutter from said full-open condition to said closed condition during a definite interval of shutter closing time; and means for energizing said flash bulb solely at said given aperture upon movement of said shutter to said full-open condition and so that said interval of shutter closing time occurs exclusively during said extended burn time for camera/subject distances between said minimum focus distance and said predetermined maximum camera/subject flash distance, to thereby maximize the exposure time for said given aperture for each subject distance and reduce the proportionate amount of flash illumination passed to the film plane during the closing interval while flash efficiency is maintained.

4. The apparatus of claim 3 wherein said maximum aperture is in the range of from f/19 to f/27.

5. The apparatus of claim 3 wherein said fixed energy of illumination is on the order of 325 zonal lumen seconds.

6. The apparatus of claim 3 wherein said burn time is substantially 20 milliseconds.

* * * * *